(12) United States Patent
Wang

(10) Patent No.: US 8,135,789 B2
(45) Date of Patent: Mar. 13, 2012

(54) ANALYZING CONTENT OF MULTIMEDIA FILES

(75) Inventor: Steven Wang, Beijing (CN)

(73) Assignee: Computer Associates Think, Inc., Islandia, NY (US)

(*) Notice: Subject to any disclaimer, the term of this patent is extended or adjusted under 35 U.S.C. 154(b) by 246 days.

(21) Appl. No.: 12/571,378

(22) Filed: Sep. 30, 2009

(65) Prior Publication Data

US 2011/0078256 A1 Mar. 31, 2011

(51) Int. Cl.
*G06F 15/16* (2006.01)
*G06F 12/00* (2006.01)

(52) U.S. Cl. .................................. 709/206; 709/207

(58) Field of Classification Search .......... 709/206–207, 709/217–219, 225–229, 250
See application file for complete search history.

(56) References Cited

U.S. PATENT DOCUMENTS

| 7,103,154 | B1* | 9/2006 | Cannon et al. | 379/67.1 |
|---|---|---|---|---|
| 7,317,908 | B1* | 1/2008 | Eason | 455/413 |
| 2002/0067808 | A1* | 6/2002 | Agraharam et al. | 379/88.14 |
| 2003/0099334 | A1* | 5/2003 | Contractor | 379/88.13 |
| 2004/0062365 | A1* | 4/2004 | Agraharam et al. | 379/88.14 |
| 2005/0159959 | A1* | 7/2005 | Benco et al. | 704/277 |
| 2006/0177022 | A1* | 8/2006 | Lai et al. | 379/88.14 |
| 2006/0233319 | A1* | 10/2006 | Van Zandt et al. | 379/67.1 |
| 2007/0129942 | A1* | 6/2007 | Ban et al. | 704/235 |
| 2007/0286363 | A1* | 12/2007 | Burg et al. | 379/88.18 |
| 2007/0293272 | A1* | 12/2007 | Salmon | 455/566 |
| 2009/0003540 | A1* | 1/2009 | Zafar | 379/88.11 |

* cited by examiner

*Primary Examiner* — Zarni Maung
(74) *Attorney, Agent, or Firm* — Scully, Scott, Murphy & Presser, P.C.

(57) ABSTRACT

A method for analyzing content of multimedia files is presented. The method comprises processing messages from mail servers, determining a type of the message, executing a convert module and obtaining text content of the message when said type is audio, extracting text from the text content or the message, creating a text version of components from the text, dividing the text version into different files, and analyzing the different files. Further, the messages can be captured, sent to a pending folder, retrieved from the pending folder. Creating the text version and dividing the text version can be performed by a mail engine. Natural language processing can be performed on the files. The text can be examined for compliance and, if appropriate, marked with quarantine violations.

10 Claims, 2 Drawing Sheets

ANALYZING CONTENT OF MULTIMEDIA FILES

FIELD OF THE INVENTION

The present disclosure relates generally to messaging systems, and more particularly to multi-media and/or audio messages and attachments.

BACKGROUND OF THE INVENTION

Enterprise messaging systems enable an entity to manage messages throughout the entity, including managing e-mail and voice mail messages. Compliance with entity guidelines and regulations can be monitored and enforced using such enterprise messaging systems, which can perform e-mail management, discovery, retention management and supervision of messages to archive, manage and track the messages.

Mobile devices can now be used to access entity messages including voice mail messages and e-mail messages and their attachments, such as video, picture and audio files. Compliance software, either stand-alone or incorporated into an enterprise messaging system, that monitors e-mail accessed both from the office and from outside can be used to verify that messages are complying with corporate requirements. Such monitoring can contain potential risks of leakage of confidential business information, among other issues.

However, with current compliance products, audio files, such as voice mail and/or attachments to e-mail messages, cannot be text extracted nor can the content be analyzed since it is in binary format. The reviewers will have to manually play the audio files to determine and review the contents; and such operations will slow down the quarantine speed and bring incorrect results caused by hearing mistakes.

BRIEF SUMMARY OF THE INVENTION

A system and method for analyzing the content of multi-media messages are provided. With this method, end users can easily perform automatic text-analysis on voice mails. The productivity is much higher than manual file play. Meanwhile, this method can avoid hearing mistakes.

The inventive method comprises processing messages from mail servers, determining a type of the message, executing a convert module and obtaining text content of the message when said type is audio, extracting text from the text content or the message, creating a text version of components from the text, dividing the text version into different files, and analyzing the different files. Further, the messages can be captured, sent to a pending folder, retrieved from the pending folder. Creating the text version and dividing the text version can be performed by a mail engine. Natural language processing can be performed on the files. The text can be examined for compliance and, if appropriate, marked with quarantine violations.

BRIEF DESCRIPTION OF THE DRAWINGS

Further features as well as the structure and operation of various embodiments are described in detail below with reference to the accompanying drawings. In the drawings, like reference numbers indicate identical or functionally similar elements.

DETAILED DESCRIPTION

Figure 1:
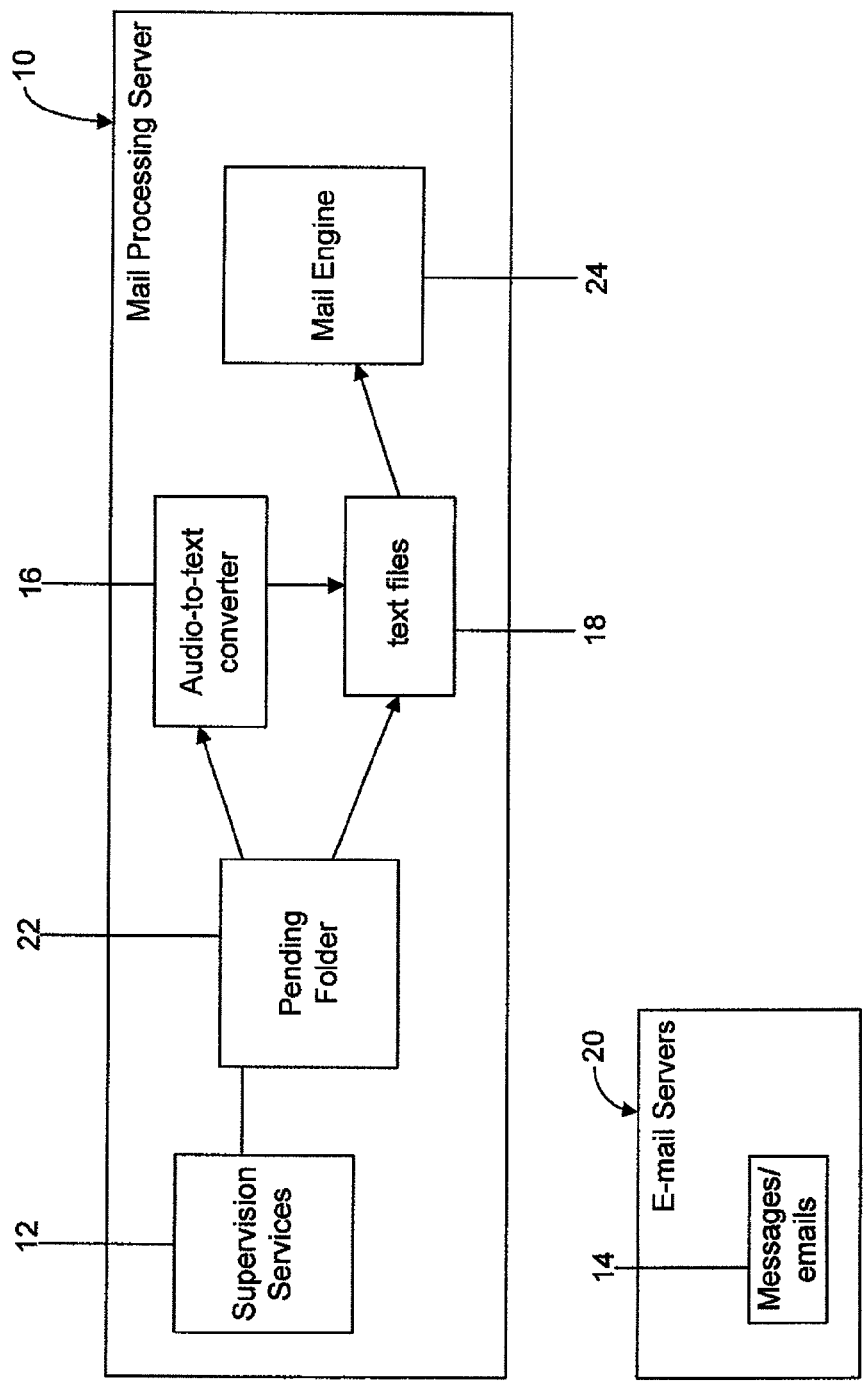
FIG. 1 is a schematic diagram of the present invention.

A system and method for analyzing the content of multi-media files is presented. The analysis can be achieved by automatic text-analysis on voice mails, voice messages, and audio attachments to e-mails. FIG. 1 is a schematic of the inventive system. The system includes a mail processing server 10 having supervision services 12 that receive mail and/or messages 14, e.g., way or other audio files, an audio-to-text converter 16 and text files 18. The supervision services 12 process the mail and messages 14 received from email servers 20. The processed messages 14 are held in a Pending folder 20 after processing. From the Pending folder 22, each message 14 is examined to determine whether it is an audio file or not. If the message 14 is an audio file, based on, for example, a voice message, voice mail, e-mail with audio attachment, the message 14 is sent to the audio-to-text converter 16, which creates text file 18.

The created text file 18, or the message if it is not an audio or multi-media file, is sent to Mail Engine 24 for analysis. Text versions of components can be created from text file 18. In one embodiment. Mail Engine 24 can then divide the whole message into the following files.

.msg—original message, e.g., using RFC 822 format
.rep—routing slip, e.g., RFC821 format
.ano—text file containing offsets to lexicons
.aco—text version of attachments, such as the text content of an audio attachment
.adb—metadata for a message which gets loaded into database tables After dividing the message, natural language processing can be performed. Further, the content of the message can be analyzed, including for compliance with regulations and/or standards. In one embodiment, the message can be marked with quarantine violations.

Figure 2:
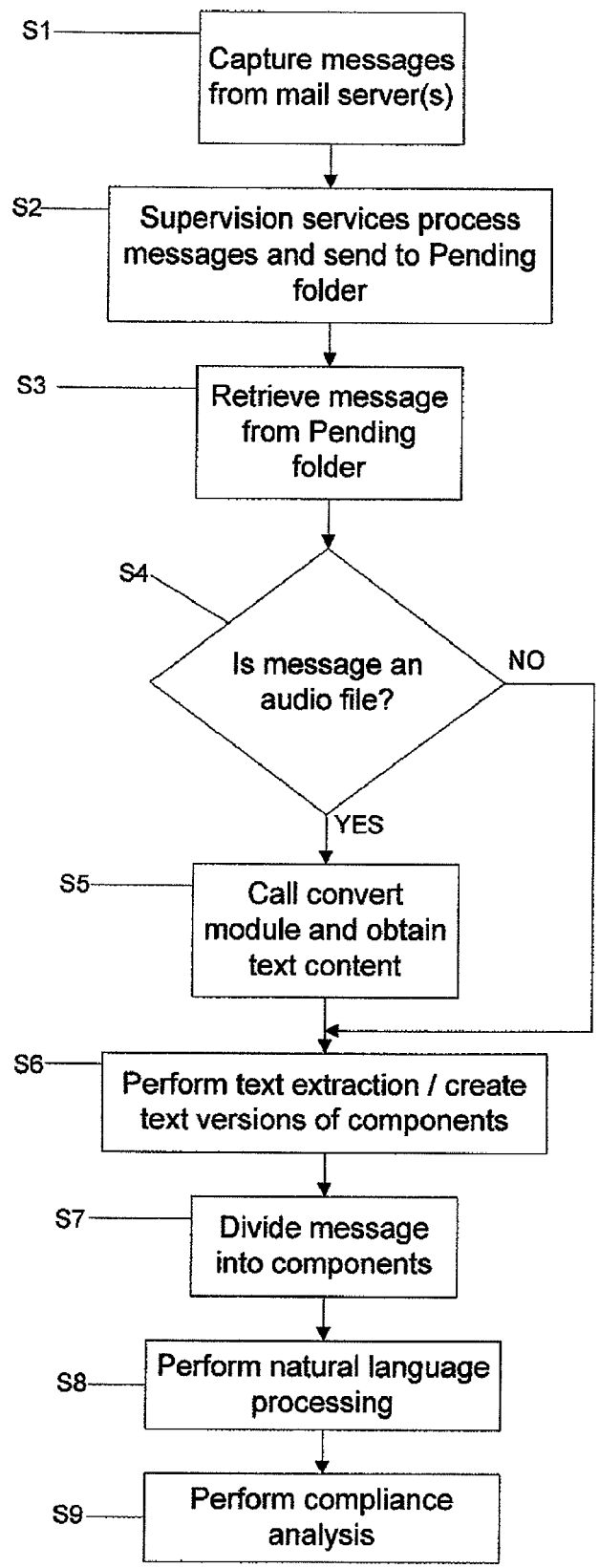
FIG. 2 is a flow diagram of the present invention.

FIG. 2 is a flow diagram of the inventive method. In step S1, messages 14 are captured from mail servers. For example, this task can be done by either end-user manual operation or by automatic agent scan and capture. In step S2, the mail and/or messages 14 are processed and sent to the Pending folder 22. In step S3, messages are retrieved from the Pending folder 22. The type of the message 14 is determined in step S4. If it is a voice mail and/or voice or audio message, e.g., a .wav file, (S4=YES), a convert module is called, in step S5, to obtain the text content, typically by converting the message from audio to text. If it is not an audio message (S4=NO), step S5 is not performed.

In step S6, text extraction is performed on the converted text message or text. When the text extraction is finished, the text is passed to a Mail Engine and a text version of components is created. In step S7, the Mail Engine decomposes or divides the data into different files. In step S8, natural language processing can be performed on one or more of the different files. In step S9, the text is analyzed for compliance and may be marked with quarantine violations, if appropriate.

The computer processing system that carries out the system and method of the present disclosure may also include a display device such as a monitor or display screen for presenting output displays and providing a display through which the user may input data and interact with the processing system, for instance, in cooperation with input devices such as a keyboard and mouse device or other pointing device or the like. The computer processing system may be also connected or coupled to one or more peripheral devices such as a printer, scanner, speaker, and any other devices, directly or via remote connections.

The computer processing system may be connected or coupled to one or more other processing systems such as email servers 20, other remote computer processing system, network storage devices, via any one or more of a local Ethernet, WAN connection, Internet, etc. or via any other networking methodologies that connect different computing systems and allow them to communicate with one another. The system dump data and/or signatures as computed above may be backed up or stored on a backup server, storage network, or on a detachable media devices such as DVD, CD's, and other storage devices.

The various functionalities and modules of the systems and methods of the present disclosure may be implemented or carried out distributedly on different processing systems or on any single platform, for instance, accessing data stored locally or distributedly on the network.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for analyzing content of multimedia files, comprising steps of:
   processing messages from mail servers;
   for each message:
      determining a type of the message;
      when said type is audio, executing a convert module and obtaining text content of the message and extracting text from the text content;
      when said type is not audio, extracting text from the message;
      creating a text version of components from the extracted text;
      dividing the text version into different files; and
   analyzing the different files, wherein the step of analyzing comprises examining the extracted text for compliance comprising at least marking the extracted text with quarantine violations.

2. The method according to claim 1, further comprising a step of capturing the messages.

3. The method according to claim 2, wherein the step of processing comprises sending the messages to a pending folder and the step of determining comprises retrieving the message from the pending folder.

4. The method according to claim 1, wherein the steps of creating the text version and dividing the text version are performed by a mail engine.

5. The method according to claim 1, further comprising a step of performing natural language processing on the different files.

6. A program storage device having computer readable program for operating on a computer for analyzing content of multimedia files, said program comprising instructions that cause the computer to perform the steps of:
   processing messages from mail servers;
   for each message:
      determining a type of the message;
      when said type is audio, executing a convert module and obtaining text content of the message and extracting text from the text content;
      when said type is not audio, extracting text from the message;
      creating a text version of components from the extracted text; and
      dividing the text version into different files; and
   analyzing the different files, wherein the step of analyzing comprises examining the extracted text for compliance comprising at least marking the extracted text with quarantine violations.

7. The program according to claim 6, further comprising a step of capturing the messages.

8. The program according to claim 7, wherein the step of processing comprises sending the messages to a pending folder and the step of determining comprises retrieving the message from the pending folder.

9. The program according to claim 6, wherein the steps of creating the text version and dividing the text version are performed by a mail engine.

10. The program according to claim 6, further comprising a step of performing natural language processing on the different files.

* * * * *